United States Patent [19]

Kühling et al.

[11] Patent Number: 5,340,905
[45] Date of Patent: Aug. 23, 1994

[54] PROCESS FOR THE PREPARATION OF THERMOPLASTIC POLYCARBONATES

[75] Inventors: Steffen Kühling; Hermann Kauth; Wolfgang Alewelt; Dieter Freitag, all of Krefeld, Fed. Rep. of Germany

[73] Assignee: Bayer Aktiengesellschaft, Leverkusen, Fed. Rep. of Germany

[21] Appl. No.: 191,227

[22] Filed: Feb. 3, 1994

Related U.S. Application Data

[63] Continuation of Ser. No. 147,651, Nov. 3, 1993, abandoned.

[30] Foreign Application Priority Data

Nov. 12, 1992 [DE] Fed. Rep. of Germany ....... 4238123

[51] Int. Cl.$^5$ .................... C08G 64/30; C08G 64/00
[52] U.S. Cl. .................... 528/199; 528/171; 528/198; 528/202; 528/206; 528/207
[58] Field of Search ............... 528/171, 198, 199, 202, 528/206, 207

[56] References Cited

U.S. PATENT DOCUMENTS

| | | | |
|---|---|---|---|
| 3,442,854 | 5/1969 | Curtius et al. | 528/198 |
| 5,026,817 | 6/1991 | Sakashita et al. | 528/199 |
| 5,097,002 | 3/1992 | Sakashita et al. | 528/199 |
| 5,142,018 | 8/1992 | Sakashita et al. | 528/199 |
| 5,151,491 | 9/1992 | Sakashita et al. | 528/199 |

FOREIGN PATENT DOCUMENTS

| | | |
|---|---|---|
| 0529093 | 2/1992 | European Pat. Off. |
| 1031512 | 11/1958 | Fed. Rep. of Germany . |
| 4038967 | 6/1991 | Fed. Rep. of Germany . |
| 4039023 | 6/1991 | Fed. Rep. of Germany . |
| 47-14742 | 12/1972 | Japan . |
| 1097058 | 12/1967 | United Kingdom . |

OTHER PUBLICATIONS

Encyclopedia of Polymer Science, vol. 10 (1969) pp. 432–462.
Chemistry & Physics of Polycarbonates, Polymer Reviews, H. Schnell, vol. 9, John Wiley & Sons, Inc. (1964) pp. 44–51.

*Primary Examiner*—John Kight, III
*Assistant Examiner*—Terressa Mosley
*Attorney, Agent, or Firm*—Joseph C. Gil; Aron Preis

[57] ABSTRACT

A two step solvent-free process for the preparation of polycarbonates having a low degree of branching is disclosed. Accordingly, the process comprise (i) transesterifying in the melt, at temperatures of from 80° to 250° C. and under atmospheric pressure and for a time of up to five hours of diphenols and carbonic acid diaryl esters in the presence of a catalyst to form an oligocarbonate having a weight average molecular weight of from 8,000 to 18,000 and an OH-end group content of from 25 to 50%, and (ii) polycondensing of said oligocarbonate at temperatures of from 250° C. to 295° C. and pressures of from <500 mbar to 0. 01 mbar, said catalyst being present in an amount of $10^{-1}$ to $10^{-8}$ tool of a catalyst per tool of diphenol, said catalyst being at least one member selected from the group consisting of quaternary ammonium compounds and quaternary phosphonium compounds.

4 Claims, No Drawings

PROCESS FOR THE PREPARATION OF THERMOPLASTIC POLYCARBONATES

This application is a continuation of application Ser. No. 08/147,651 filed Nov. 3, 1993, now abandoned.

The present invention relates to a process for the preparation of polycarbonates which have a low degree of branching by solvent free transesterification of diphenols, carbonic acid diaryl esters and catalysts at temperatures of from 80° C. to 295° C. and pressures of from 1,000 mbar to 0.01 mbar, characterized in that the catalysts used are quaternary ammonium compounds or quaternary phosphonium compounds in quantities of from $10^{-1}$ to $10^{-8}$ mol, based on 1 tool of diphenol, in that the process is carried out in two stages, the reactants being melted in the first stage at temperatures of from 80° C. to 250° C., preferably from 100° C. to 230° C. and in particular 120° C. to 190° C., under atmospheric pressure within a period of up to five hours, preferably from 0.25 hours to 3 hours, and an oligocarbonate being then prepared by the removal of monophenols by distillation by raising of the temperature (up to 260° C.) in a vacuum (from atmospheric pressure to 1 mbar) with addition of the catalyst, and this oligocarbonate being then polycondensed in the second stage at temperatures from 250° C. to 295° C. and pressures from <500 mbar to 0.01 mbar, and in that the process is controlled so that the oligocarbonate produced in the first stage has an $\overline{M}_W$ of from 8,000 to 18,000, preferably from 9,000 to 15,000, and an OH end group content of from >25% to <50%, preferably from 30% to 45%.

The polycarbonates obtainable by the process according to the invention are solvent free and with low degrees of branching and have a light intrinsic colour.

The preparation of aromatic oligo/polycarbonates by the solvent free transesterification process is known from the literature and has been described, for example, in the Encyclopedia of Polymer Science, Vol. 10 (1969), Chemistry and Physics of polycarbonates, Polymer Reviews, H. Schnell, Vol. 9, John Wiley and Sons, inc. (1964) and in DP 1 031 512.

The catalysts described in the above literature and in the literature references given there are basic alkali metal, alkaline earth and transition metal hydroxides, alcoholates, carbonates, acetates, boranates, hydrogenphosphates and hydrides. When these compounds are used, undesirable side reactions take place during the transesterification so that branched polycarbonates (see comparison examples 1, 2, 8) are obtained, which are inferior in optical and mechanical properties compared with straight chain polycarbonates.

Quaternary ammonium/phosphonium compounds are described as catalysts for solvent free transesterification in U.S. Pat. No. 3,442,854. The polycondensation stage, however, requires reaction temperatures of >300° C. for several hours in order to obtain high molecular weight polycarbonates. Further, these products do not have a low degree of branching (see Comparison Examples 3, 4, 5,9).

EP Applications 360 578 and 351 168 describe ammonium salts in combination with alkali metal/alkaline earth metal salts and boric acids/boric acid esters and JA 7 214 742 describes tetramethyl ammonium hydroxide in combination with alkali metal/alkaline earth metal salts as catalysts used under polycondensation conditions at temperatures of 280° C.; this procedure also fails to result in polycarbonates with a low degree of branching (see Comparison Examples 6,7).

Catalysts which are acid in reaction (organic acids, salts of these acids and esters of the organic acids) giving rise to light coloured polycarbonates which are free from OH end groups and free from branching are described in BE 677 424.

Free from branching means, in the context of the invention, a carboxyl group content of <500 ppm. This is no longer sufficient to describe the freedom from branching according to the present state of the art. Moreover, condensation times above five hours are required for preparing the polycarbonates, which means that the volume/time yield is low.

It has surprisingly been found that quaternary ammonium or phosphonium compounds are suitable as catalysts for the solvent free transesterification of an aromatic dihydroxy compound and a carbonic acids diester for the preparation of solvent free polycarbonates with a low degree of branching if the polycondensation temperature is below 295° C. and the oligocarbonate formed as intermediate product has an OH/aryl carbonate end group ratio of from >25% OH: <75% aryl carbonate to <50% OH: >50% aryl carbonate, preferably from 30% OH: 70% aryl carbonate to 45% OH: 55% aryl carbonate.

Similar OH/aryl carbonate end group ratios for the oligocarbonates formed as intermediate products are required according to DE-OS 40 39 023 and DE-OS 40 38 967, but the synthesis of these oligocarbonates is carried out via the phase interfaces so that freedom from solvent cannot be ensured.

Solvent free in the context of the process according to the invention means that no halogenated hydrocarbons, no ketones and no hydrocarbons are used in the process of preparation of the polycarbonates.

A low degree of branching in the context of the process according to the invention means that the proportion of branching radicals corresponding to Formula (I)

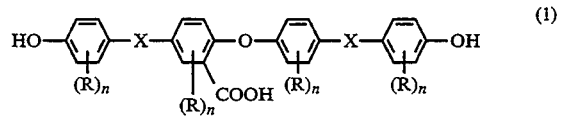

(1)

wherein $X = C_1$-$C_8$ alkylidene or $C_5$ to $C_{12}$ cycloalkylidene, S, $SO_2$ or a single bond, $R = CH_3$, Cl or Br and n stands for zero, 1 or 2, does not exceed a value of 75 ppm in the polycarbonate after total saponification and determination of HPLC.

Diphenols suitable for the process according to the invention are those corresponding to Formula (2)

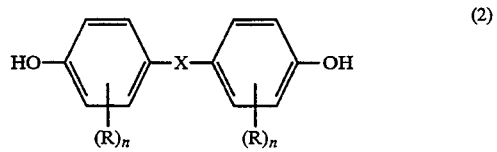

(2)

wherein X, R and n have the meanings indicated for (1).

The following are examples of preferred diphenols:
4,4-dihydroxydiphenyl,
4,4'-dihydroxydiphenyl sulfide,
1,1-bis-(4-hydroxyphenyl)-cyclohexane,
Bis-(4-hydroxyphenyl)-methane, 2,2-bis-(4-hydroxyphenyl)-propane,
2,4-bis-(4-hydroxyphenyl)-2-methylbutane,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-( 3,5-dimethyl-4-hydroxyphenyl )-sulfone,
2,4-bis-(3,5-dimethyl-4-hydroxyphenyl )-2-methylbutane,
2,2-bis-(3,5-dichloro-4-hydroxyphenyl )-propane,
2,2-bis-(3,5-dibromo-4-hydroxyphenyl)-propane,
1,1-bis-(4-hydroxyphenyl)-3,3,5-trimethylcyclohexane.

2,2-bis-(4-hydroxyphenyl)-propane and 1,1-bis-(4-hydroxyphenyl)-3,3,5-trimethylcyclohexane are particularly preferred diphenols among those mentioned above.

Carbonic acid diaryl esters in the context of the present invention are di-$C_6$-$C_{14}$-arylesters, preferably the diesters of phenol or of alkyl substituted phenols, i.e. diphenol carbonate or dicresyl carbonate. Based on 1 mol of diphenol, the carbonic acid diaryl esters are used in quantities of from 1.01 to 1.30 mol, preferably in quantities of from 1.02 to 1.15 mols.

Care must be taken to ensure that the reactants, i.e. the diphenols and the carbonic acids diaryl esters, are free from alkali metal and alkaline earth ions although quantities of alkali metal or alkaline earth ions below 0.1 ppm can be tolerated. Such pure diphenols and carbonic acids diaryl esters are obtainable by re-crystallizing the carbonic acid diaryl esters or diphenols and washing or distilling.

Preferred quantities of ammonium catalysts or phosphonium catalysts are from $10^{-2}$ mol to $10^{-7}$ mol per mol of diphenols.

Preferred catalysts are those corresponding to Formulae (3) and (4)

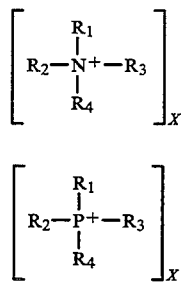

wherein $R_{1-4}$ may denote the same or different $C_1$-$C_{18}$-alkyls, $C_6$-$C_{10}$ aryls or $C_5$-$C_6$ cycloalkyls and $X^-$ may stand for an anion in which the corresponding acid-base pair $H^+ + X^- \longleftrightarrow HX$ has a $pK_B$ of $<11$.

The following are examples of catalysts for the process according to the invention:
Tetramethyl ammonium hydroxide,
Tetramethyl ammonium acetate,
Tetramethyl ammonium fluoride,
Tetramethyl ammonium tetraphenyl boranate,
Tetraphenyl phosphonium fluoride,
Tetraphenyl phosphonium tetraphenyl boranate,
Dimethyl diphenyl ammonium hydroxide,
Tetramethyl ammonium hydroxide The catalysts may also be used in combination (two or more) with one another.

The weight average molecular weight $\overline{M}_W$ of the oligocarbonates are determined by measuring the relative solution viscosity in $CH_2Cl_2$ or in mixtures of equal quantities by weight of phenol/o-dichlorbenzene and calibrating by measuring the light scattering.

The OH end group content of the oligocarbonates is defined as $$x \, mol \, \% = \frac{\text{Number of OH-end groups}}{\text{Total number of end groups}} \times 100$$

The OH/aryl carbonate end group ratio of the oligocarbonates was determined by the separate determination of, on the one hand, the OH end groups by photometric determination using $TiCl_4$ and, on the other hand, the aryl carbonate end groups by HPLC determination of the monophenol formed after total saponification.

The OH end groups and the aryl carbonate end groups in the oligocarbonate together generally amount to 100%.

The process according to the invention may be carried out either continuously or intermittently, for example in stirrer vessels, thin layer evaporators, cascades of stirrer vessels, extruders, kneaders, simple disc reactors or high viscosity disc reactors.

The polycarbonates obtainable by the process according to the invention may have weight average molecular weights $M_W$ of about 20,000 to about 200,000, preferably about 22,000 to 60,000, the $M_W$ being again determined by the relative solution viscosity in $CH_2Cl_2$ or in mixtures of equal quantities by weight of phenol-/o-dichlorbenzene and calibration being again carried out by light scattering.

The polycarbonates obtainable according to the invention have the usual OH end group contents known from the literatures.

This is preferably achieved by condensing low molecular weight oligocarbonates by monophenol distillation to polycarbonates of relatively low viscosity and condensing relatively high molecular weight oligocarbonates to polycarbonates of relatively high molecular weight.

According to EP 360 578, end groups other than those provided by the carbonic acid diaryl esters may be introduced as required by transesterification with relatively high boiling phenols such as cumyl phenol, t-butyl phenol or isooctyl phenol.

The polycarbonates obtainable according to the invention may be isolated by, for example, discharging, centrifuging and granulating.

Auxiliary agents and reinforcing materials maybe added to the polycarbonates produced according to the invention for improving the properties. The following, inter alia, may be used for this purpose: stabilizers, flow improvers, mould release agents, fire retardants, pigments, finely divided minerals, fibers, e.g. alkyl and aryl phosphites, phosphates and phosphanes, low molecular weight carboxylic acid esters, halogen compounds, salts, chalk, powdered quartz and glass and carbon fibers.

The polycarbonates according to the invention may also be mixed with other polymers, e.g. polyolefins, polyurethanes or polystyrene.

These substances are preferably added to the finished polycarbonate in conventional apparatus but they may also be added in another stage of the process according to the invention, as required.

The polycarbonates obtainable by the process according to the invention may be worked up into any moulded products such as films or plates by the usual methods using conventional machines such as, for example, extruders or injection moulding machines.

These polycarbonate mouldings may be used technically, for example in optics and in electrotechnology and in the building industry.

EXAMPLES

Comparison Example 1

114.15 g (0.500 mol) of bisphenol A and 113.54 g (0.530 mol) of diphenyl carbonate are weighed into a 500 ml three necked flask equipped with stirrer, internal thermometer and vigreux column (30 cm, mirrored) with bridge. The apparatus is freed from atmospheric oxygen by the application of a vacuum and rinsing with nitrogen (3 times) and the mixture is heated to 150° C. 0.00029 g ($5 \times 10^{-4}$ mol %) of sodium phenolate, based on bisphenol A, are then added as a 1% aqueous solution and the phenol which is formed in the process is distilled off at 100 mbar. At the same time, the temperature is raised to 250° C. After one hour, the vacuum is improved to 10 mbar. The oligocarbonate formed as intermediate product has an OH:aryl carbonate end group ratio of 32:68. Polycondensation is achieved by lowering the vacuum to 0.5 mbar and raising the temperature to 280° C. A solvent free polycarbonate having a relative solution viscosity of 1.388 (dichloromethane, 25° C., 5 g/l) is obtained. The proportion of branching radicals of Formula (I) in the polycarbonate produced is 350 ppm.

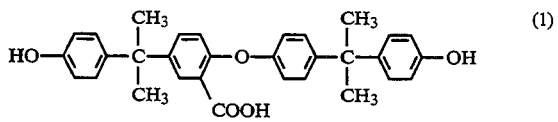

(I)

Comparison Example 2

The same as Comparison Example 1 except that the oligocarbonate formed as intermediate product has an OH:aryl carbonate end group ratio of 20:71. The polycondensation temperature is 275° C. A solvent free polycarbonate having a relative solution viscosity of 1.249 (dichloromethane, 25° C., 5 g/l) is obtained. The proportion of branching radicals of Formula (I) in the polycarbonate produced is 128 ppm.

Comparison Example 3

The same as comparison Example 1 except that 0.0039 g of N(CH$_3$)$_4$B(C$_6$H$_5$)$_4$ ($2 \times 10^{-3}$ mol %) of solid substance is used. The oligocarbonate formed as intermediate product has an OH:aryl carbonate end group ratio of 32:68. The polycondensation temperature is 300° C. A light coloured, solvent free polycarbonate having a relative solution viscosity of 1.236 (dichloromethane, 25° C., 5 g/l) is obtained. The proportion of branching radicals of Formula (I) in the polycarbonate produced is 110 ppm.

Comparison Example 4

The same as Comparison Example 3 except that the oligocarbonate formed as intermediate product has an OH:aryl carbonate end group ratio of 38:62. The polycondensation temperature is 310° C. A light coloured, solvent free polycarbonate having a relative solution viscosity of 1.265 (dichloromethane, 25° C., 5 g/l) is obtained. The proportion of branching radicals of Formula (I) in the polycarbonate produced is 205 ppm.

Comparison Example 5

The same as Comparison Example 3 except that the oligocarbonate formed as intermediate product has an OH:aryl carbonate end group ratio of 35:65. The polycondensation temperature is 320° C. A light coloured, solvent free polycarbonate having a relative solution viscosity of 1.348 (dichloromethane, 25° C., 5 g/l) is obtained. The proportion of branching radicals of Formula (I) in the polycarbonate produced is 440 ppm.

Comparison Example 6

The same as Comparison Example 1 except that 0.0045 g of N(CH$_3$)$_4$OH ($1 \times 10^{-2}$ mol %) are used in 25% methanol solution, 0.0003 g of NaHCO$_3$ ($1 \times 10^{-2}$ mol %) are used in 1% aqueous solution and 0.0039 g of H$_3$BO$_3$ are used as solid substance. The oligocarbonate formed as intermediate product has an OH: aryl carbonate end group ratio of 36:64. The polycondensation temperature is 280° C. A light coloured solvent free polycarbonate having a relative solution viscosity of 1.357 (dichloromethane, 25° C., 5 g/l) is obtained. The proportion of branching radicals of Formula (I) in the polycarbonate produced is 390 ppm.

Comparison Example 7

The same as Comparison Example 1 except that 0.0045 g of N(CH$_3$)$_4$OH ($1 \times 10^{-2}$ mol %) and 0.0003 g NaHCO$_3$ ($1 \times 10^{-2}$ mol %) are used in 1% aqueous solution. The oligocarbonate formed as intermediate product has an OH:aryl carbonate end group ratio of 38:62. The polycondensation temperature is 280° C. A light coloured, solvent free polycarbonate having a relative solution viscosity of 1.305 (dichloromethane, 25° C., 5 g/l) is obtained. The proportion of branching radicals of Formula (I) in the polycarbonate produced is 730 ppm.

Example 1

The same as Comparison Example 1 except that 0.0039 g of N(CH$_3$)$_4$B(C$_6$H$_5$)$_4$ ($2 \times 10^{-3}$ mol %) is used as solid substance. The oligocarbonate formed as intermediate product has an OH:aryl carbonate end group ratio of 40:60. The polycondensation temperature is 280° C. A light coloured, solvent free polycarbonate having a relative solution viscosity of 1.287 (dichloromethane, 25° C., 5 g/l) is obtained. The proportion of branching radicals of Formula (I) in the polycarbonate produced is 12 ppm.

Example 2

The same as Comparison Example 1 except that 0.0009 g of N(CH$_3$)$_4$OH ($2 \times 10^{-3}$ mol %) is used. The oligocarbonate formed as intermediate product has an OH:aryl carbonate end group ratio of 33:67. The polycondensation temperature is 280° C. A light coloured, solvent free polycarbonate having a relative solution viscosity of 1.266 (dichloromethane, 25° C., 5 g/l) is obtained. The proportion of branching radicals of Formula (I) in the polycarbonate produced is 18 ppm.

Example 3

The same as Comparison Example 1 except that 0.0065 g of PPh$_4$BPh$_4$ ($2 \times 10^{-3}$ mol %) is used as solid substance. The oligocarbonate formed as intermediate products has an OH:aryl carbonate end group ratio of 37:63. The polycondensation temperature is 280° C. A light coloured, solvent free polycarbonate having a relative solution viscosity of 1,300 (dichloromethane, 25° C., 5 g/l) is obtained. The proportion of branching radical of Formula (I) in the polycarbonate produced is 3 ppm.

Example 4

The same as Comparison Example 1 except that 0.0065 g of PPh$_4$BPh$_4$ ($2 \times 10^{-3}$ mol %) is used as solid substance. The oligocarbonate formed as intermediate product has an OH:aryl carbonate end group ratio of 35:65. The polycondensation temperature is 280° C. A light coloured, solvent free polycarbonate having a relative solution viscosity of 1.265 (dichloromethane, 25° C., 5 g/l) is obtained. The proportion of branching radicals of Formula (I) in the polycarbonate produced is 2 ppm.

Example 5

The same as Comparison Example 1 except that 0.0039 g of N(CH$_3$)$_4$B(C$_6$H$_5$)$_4$ ($2 \times 10^{-3}$ mol %) is used as solid substance. The oligocarbonate formed as intermediate product has an OH:aryl carbonate end group ratio of 31:69. The polycondensation temperature is 280° C. A light coloured, solvent free polycarbonate having a relative solution viscosity of 1,222 (dichloromethane, 25° C., 5 g/l) is obtained. The proportion of branching radicals of Formula (I) in the polycarbonate produced is 17 ppm.

The Comparison Examples and Examples are shown side by side in Table I.

TABLE 1

| | Catalyst | Oligocarbonate end group ratio: OH/aryl carbonate | Reaction temperature (°C.) | eta$_{rel}$ | Branching radical content (ppm) |
|---|---|---|---|---|---|
| Comp. Ex. 1 | Sodium phenolate | 32:68 | 280 | 1.388 | 350 |
| Comp. Ex. 2 | Ssodium phenolate | 29:71 | 275 | 1.249 | 128 |
| Comp. Ex. 3 | N(CH$_3$)$_4$B(C$_6$H$_5$)$_4$ | 32:68 | 300 | 1.236 | 110 |
| Comp. Ex. 4 | N(CH$_3$)$_4$B(C$_6$H$_5$)$_4$ | 38:62 | 310 | 1.265 | 205 |
| Comp. Ex. 5 | N(CH$_3$)$_4$B(C$_6$H$_5$)$_4$ | 35:65 | 320 | 1.348 | 440 |
| Comp. Ex. 6 | N(CH$_3$)$_4$OH NaHCO$_3$ H$_3$BO$_3$ | 36:64 | 280 | 1.357 | 390 |
| Comp. Ex. 7 | N(CH$_3$)$_4$OH NaHCO$_3$ | 38:62 | 280 | 1.305 | 730 |
| PC from Ex. 1 | N(CH$_3$)$_4$B(C$_6$H$_5$)$_4$ | 40:60 | 280 | 1.287 | 12 |
| PC from Ex. 2 | N(CH$_3$)$_4$OH | 33:67 | 280 | 1.266 | 18 |
| PC from Ex. 3 | PPh$_4$BPh$_4$ | 37:63 | 280 | 1.300 | 3 |
| PC from Ex. 4 | PPh$_4$BPh$_4$ | 35:65 | 280 | 1.265 | 2 |
| PC from Ex. 5 | N(CH$_3$)$_4$BPh$_4$ | 31:69 | 280 | 1.222 | 17 |

Example 6

The same as Comparison Example 1 except that 117.82 g (0.55 mol) of diphenyl carbonate (corresponding to 10 mol % diphenyl carbonate excess) are used as solid substance and 0.0009 g of N(CH$_3$)$_4$OH ($2 \times 10^{-3}$ mol %) are used in 1% aqueous solution. The oligocarbonate formed as intermediate product has an OH: aryl carbonate end group ratio of 14:86. The polycondensation temperature is 280° C. A light coloured, solvent free polycarbonate having a relative solution viscosity of 1. 135 (dichloromethane, 25° C., 5 g/l) is obtained. The proportion of branching radicals of Formula (I) in the polycarbonate produced is 3 ppm.

Example 7

The same as Comparison Example 1, except that 110.21 g (0. 515 mol) of diphenyl carbonate ( corresponding to 3 mol % of diphenyl carbonate excess) are used as solid substance and 0.0009 g of N(CH$_3$)$_4$OH ($2 \times 10^{-3}$ mol %) are used in 1% aqueous solution. The oligocarbonate formed as intermediate product has an OH: aryl carbonate end group ratio of 55: 45. The polycondensation temperature is 280° C. A light coloured, solvent-free polycarbonate having a relative solution viscosity of 1.197 (dichloromethane, 25° C., 5 g/l) is obtained. The proportion of branching radicals of Formula (I) in the polycarbonate produced is 15 ppm.

Example 8

The same as Comparison Example 1 except that 108.18 g (0. 505 mol) of diphenyl carbonate (corresponding to 1 mol % of diphenyl carbonate excess) as solid substance and 0.0009 g of N(CH$_3$)$_4$OH ($2 \times 10^{-3}$ mol %) are used. The oligocarbonate formed as intermediate product has an OH: aryl carbonate end group ratio of 87:13. The polycondensation temperature is 280° C. A light coloured, solvent free oligocarbonate having a relative solution viscosity of 1.105 (dichloromethane, 25° C., 5 g/l) is obtained. The proportion of branching radicals of Formula (I) in the polycarbonate produced is 3 ppm.

These examples are shown in Table 2.

TABLE 2

| | Catalyst | Oligocarbonate end group ratio: OH/aryl carbonate | Reaction temperature (°C.) | eta$_{rel}$ | Branching radical content (ppm) |
|---|---|---|---|---|---|
| PC from Ex. 2 | N(CH$_3$)$_4$OH | 33:67 | 280 | 1.266 | 18 |
| PC from Ex. 6 | N(CH$_3$)$_4$OH | 14:86 | 280 | 1.135 | 3 |
| PC from Ex. 7 | N(CH$_3$)$_4$OH | 55:45 | 280 | 1.197 | 15 |
| PC from Ex. 8 | N(CH$_3$)$_4$OH | 87:13 | 280 | 1.105 | 3 |

Example 9

5 130 g (22.5 mol) of bisphenol A, 5 056 g (23.63 mol) of diphenyl carbonate and 592 mg of PPh$_4$BPh$_4$ ($4 \times 10^{-3}$ mol %) are weighed into a 25 liter stirrer vessel. The vessel is made inert with nitrogen and the raw materials are heated to 180° C. within 15 minutes. The stirrer is switched on when the reaction temperature is 100° C. and a vacuum of 100 mbar is applied. The temperature is kept at 180° C. for one hour and the phenol released is distilled off through a column. The temperature is raised to 250° C. within a further hour and the vacuum is then increased to 10 mbar within 30 minutes. The oligocarbonate formed as intermediate product has an OH:aryl carbonate end group ratio of 31:69. After the reaction temperature has increased to 290° C., the reaction mixture is polycondensed in a high vacuum (1 mbar). After ventilation with nitrogen, the polycarbonate is discharged from the vessel and granulated.

The relative solution viscosity of the polycarbonate which has been isolated is 1.268 (dichloromethane, 25° C., 5 g/l). The proportion of branching radicals of. Formula (I) in the polycarbonate produced is 40 ppm.

Example 10

The same as Example 9 except that 5 130 g (22.5 mol) of bisphenol A, 4 959 g (23.18 mol) of diphenyl carbonate and 592 mg PPh$_4$BPh$_4$(4×10$^{-3}$ mol %) are weighed in. The oligocarbonate formed as intermediate product has an OH:aryl carbonate end group ratio of 35:65. After the reaction temperature has been raised to 290° C., polycondensation is carried out in a high vacuum (1 mbar). The relative solution viscosity of the isolated polycarbonate is 1.264 (dichloromethane, 25° C., 5 g/l). The proportion of branching radicals of Formula (I) in the polycarbonate produced is 30 ppm.

Example 11

The same as Example 9 except that 5 130 g (22.5 mol) of bisphenol A, 5 152 g (24.08 mol) diphenyl carbonate and 353 mg of NMe$_4$BPh$_4$ (4×10$^{-3}$ mol %) are weighed in. The oligocarbonate formed as intermediate product has an OH:aryl carbonate end group ratio of 39:61. After the reaction temperature has been raised to 290° C., polycondensation is carried out in a high vacuum (1 mbar). The relative solution viscosity of the isolated polycarbonate is 1.287 (dichloromethane, 25° C., 5 g/l). The proportion of branching radicals of Formula (I) in the polycarbonate produced is 54 ppm.

Example 12

The same as Example 9 except that 5 130 g ( 22.5 mol ) of bisphenol A, 5 453 g (24.53 mol) of diphenyl carbonate and 353 mg of NMe$_4$BPh$_4$ (4×10$^{-3}$ mol %) are weighed in. The oligocarbonate formed as intermediate product has an OH: aryl carbonate end group ratio of 33: 67. After the reaction temperature has been raised to 290° C., polycondensation is carried out in a high vacuum (1 mbar). The relative solution viscosity of the isolated polycarbonate is 1. 264 (dichloromethane, 25° C., 5 g/l). The proportion of branching agent of Formula (I) in the polycarbonate produced is 40 ppm.

Comparison Example 8

The same as Example 9 except that 5 130 g (22.5 mol) of bisphenol A, 5 152 g (24.08 mol) of diphenyl carbonate and 52.5 mg of Na phenolate (2×10$^{-3}$ mol %) are weighed in. The oligocarbonate formed as intermediate product has an OH:aryl carbonate end group ratio of 33:67. After the reaction temperature has been raised to 290° C., polycondensation is carried out in a high vacuum (1 mbar). The relative solution viscosity of the isolated polycarbonate is 1,276 (dichloromethane, 25° C., 5 g/l). The proportion of branching agent of Formula (I) in the polycarbonate produced is 980 ppm.

Comparison Example 9

The same as Example 9 except that 5 130 g (22.5 mol) of bisphenol A, 5 152 g (24.08 mol) of diphenyl carbonate and 882 mg of NMe$_4$BPh$_4$ (1×10$^{-2}$ mol %) are weighed in. The oligocarbonate formed as intermediate product has an OH:aryl carbonate end group ratio o f 36: 64. When the reaction temperature has been raised to 310° C., polycondensation is carried out in a high vacuum (1 mbar). The relative solution viscosity of the isolated polycarbonate is 1.319 (dichloromethane, 25° C., 5 g/l). The proportion of branching radicals of Formula (I) in the polycarbonate produced is 690 ppm.

The results of these scale-up experiments are shown in Table 3.

TABLE 3

| Scale up experiments | Catalyst | Oligocarbonate end group ratio: OH/aryl carbonate | Reaction temperature (°C.) | eta$_{rel}$ | Branching agent content (ppm) |
|---|---|---|---|---|---|
| PC from Ex. 9 | PPh$_4$BPh$_4$ | 31:69 | 290 | 1.268 | 40 |
| PC from Ex. 10 | PPh$_4$BPh$_4$ | 35:65 | 290 | 1.264 | 30 |
| PC from Ex. 11 | N(CH$_3$)$_4$BPh$_4$ | 39:61 | 290 | 1.287 | 54 |
| PC from Ex. 12 | N(CH$_3$)$_4$BPh$_4$ | 33:67 | 290 | 1.264 | 40 |
| Comp. Ex. 8 | Na Phenolate | 33:67 | 290 | 1.276 | 980 |
| Comp. Ex. 9 | N(CH$_3$)$_4$BPh$_4$ | 38:64 | 310 | 1.319 | 690 |

What is claimed is:

1. A two step solvent-free process for the preparation of polycarbonates having a low degree of branching comprising
   (i) transesterifying in the melt, at temperatures of from 80° to 250° C. and under atmospheric pressure and for a time of up to five hours of diphenols and carbonic acid diaryl esters in the presence of a catalyst to form an oligocarbonate, said oligocarbonate having a weight average molecular weight of from 8,000 to 18,000 and an OH-end group content of from 25 to 50%, and
   (ii) polycondensing of said oligocarbonate at temperatures of from 250° C. to 295° C. and pressures of from <500 mbar to 0.01 mbar,
   said catalyst being present in an amount of 10$^{-1}$ to 10$^{-8}$ mol of a catalyst per mol of diphenol, said catalyst being at least one member selected from the group consisting of quaternary ammonium compounds and quaternary phosphonium compounds.

2. The process of claim 1 wherein said catalyst is a compound selected from the group consisting of compounds corresponding to formulae (3) and formula (4)

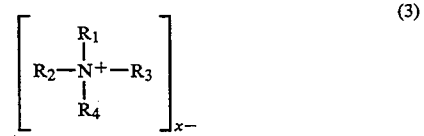

(3)

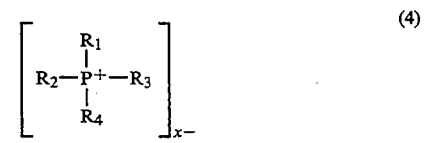

(4)

wherein R$_{1-4}$ independently denote C$_{1-18}$-alkyl, C$_{6-10}$-aryl or C$_{5-6}$-cycloalkyl, and X$^-$ denotes an anion in which the corresponding acid-base pair H$^+$+X$^-$=HX has a pK$_b$ of less than 11.

3. The process of claim 1 wherein catalyst is at least one member selected from the group consisting of
Tetramethyl ammonium hydroxide,
Tetramethyl ammonium acetate,
Tetramethyl ammonium fluoride,
Tetramethyl ammonium tetraphenyl boranate,
Tetraphenyl phosphonium fluoride,
Tetraphenyl phosphonium tetraphenyl boranate,
Dimethyl diphenyl ammonium hydroxide,
Tetramethyl ammonium hydroxide.

4. The process of claim I wherein monophenol is removed from said oligocarbonate by distillation in vacuum at a temperature of up to 260° C. prior to said polycondensing.

* * * * *